May 9, 1961 T. J. LA CHAPELLE, JR 2,983,086
FLANGED LAPPING JIG
Filed April 30, 1959 2 Sheets-Sheet 1
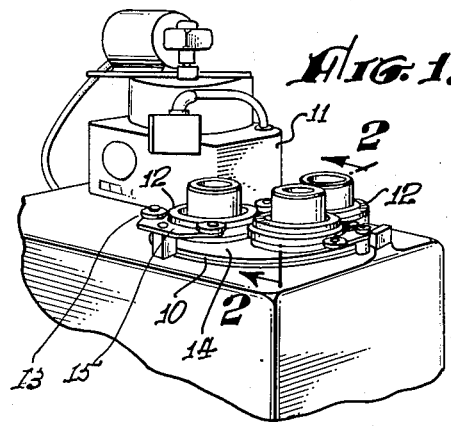
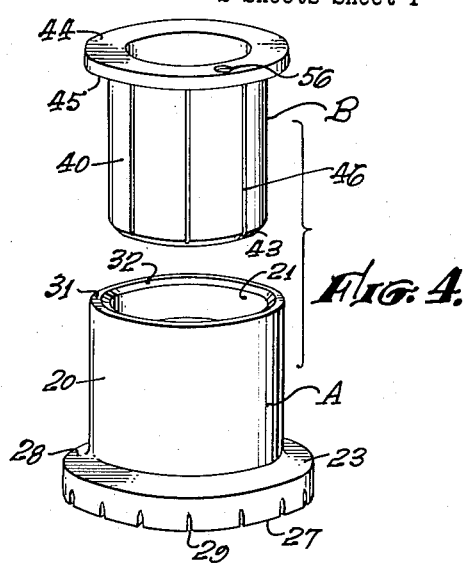
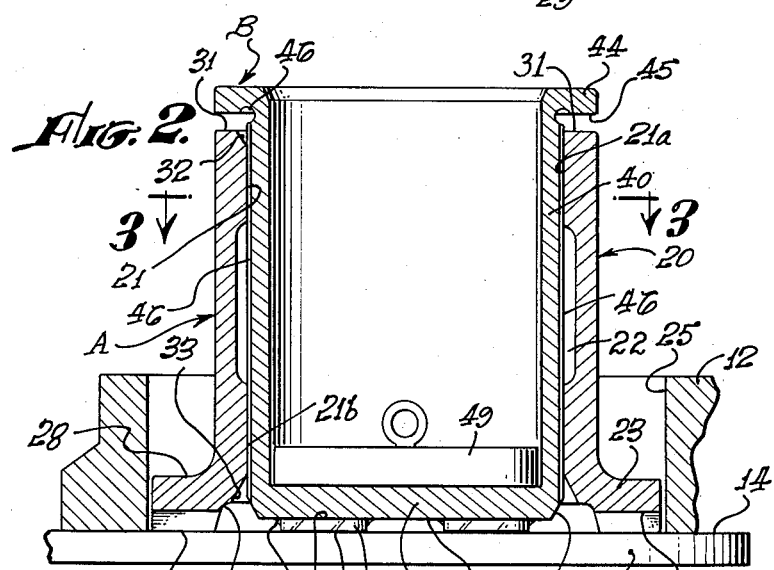
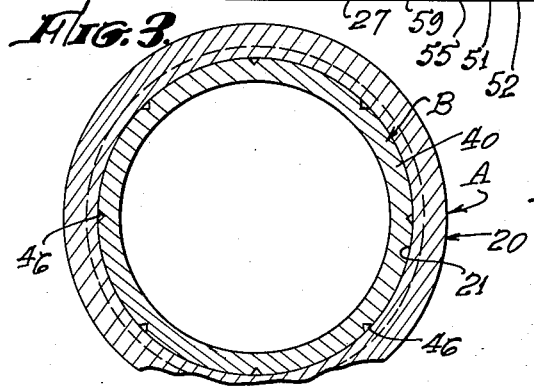
THEODORE J. LaCHAPELLE, JR.,
INVENTOR.
BY Spensley and Horn
ATTORNEYS.

May 9, 1961

T. J. LA CHAPELLE, JR 2,983,086

FLANGED LAPPING JIG

Filed April 30, 1959

THEODORE J. LA CHAPELLE, JR,
INVENTOR.

BY Spensley and Horn

ATTORNEYS

United States Patent Office 2,983,086
Patented May 9, 1961

2,983,086

FLANGED LAPPING JIG

Theodore J. La Chapelle, Jr., Los Angeles, Calif., assignor to Pacific Semiconductors, Inc., a corporation of Delaware Filed Apr. 30, 1959, Ser. No. 810,133

6 Claims. (Cl. 51—237)

This invention relates to lapping apparatus and more particularly to an improved lapping jig to be used in conjunction with a planar lapping wheel.

Although not limited thereto, the present invention is particularly advantageous in the semiconductor industry in which small crystals of semiconductive material such as germanium or silicon are used as the heart of an electrical translating device. These devices, including photocells, diodes and transistors have their parameters dependent in large measure upon the physical dimensions and configuration of the crystal. It is especially important to produce semiconductor device crystals of accurately controlled thickness having opposed faces or surfaces which are flat and parallel to a high degree of precision.

The most common and satisfactory method for obtaining flat parallel faces at a predetermined thickness has been through the use of precision flat lapping machines using a flat, stable, slowly rotating lapping wheel of the type well known to the art. Such wheels are sold under various trade names and include a flat lapping plate which rotates in a horizontal plane. Some means are provided for supplying an abrasive material such as boron carbide, silicon carbide or alumina to the rotating surface. The surface of the semiconductor crystal is then maintained against the rotating abrasive plate which causes the surface of the crystal to be ground flat. The difficulty in obtaining flatness of the required precision together with parallelism and thickness within the required tolerances is apparent, however, when it is noted that these dimensions and configurations are measured in terms of light fringes (where 1 light fringe=0.000012 inch).

Accordingly, it is an object of the present invention to provide means for maintaining the orientation of a body to be lapped such that the reference face of the body is parallel to the lapping plate surface.

It is another object of the present invention to provide means for holding and positioning a body to be lapped with respect to a flat rotating lapping wheel to obtain an accurately controlled flat planar surface on the body.

A further object is to provide a lapping jig for lapping flat parallel surfaces on a crystal which lapping jig provides precision of flatness and parallelism of opposed faces of the crystal.

Yet another object of the present invention is to provide such a lapping jig by means of which the pressure on the crystal being lapped can be controlled and varied. A still further object of the present invention is to provide such a lapping jig whereby the thickness of the crystal between parallel surfaces can be predetermined and controlled.

The present invention is a lapping jig for holding and positioning bodies to be lapped on a flat lapping plate and includes a mounting or holding piston, which piston has a flat lower mounting surface. The body to be lapped is affixed to the lower piston surface. The holding piston is slidably mateable with a guide cylinder having an internal configuration corresponding to the external configuration of the piston. The lower surface, or contact surface of the cylinder is flat and parallel to the mounting surface of the piston when the piston is slidably engaged in the cylinder. Fluid passages are provided in the contact surface of the cylinder for permitting the passage of abrasive material beneath the contact surface into the interior of the cylinder and hence to the piston surface or the material mounted on the piston.

The novel features which are believed to be characteristic of the invention, both as to its organization and method of operation, together with further objects and advantages thereof, will be better understood from the following description considered in connection with the accompanying drawings in which the presently preferred embodiment of the present invention is illustrated by way of example. It is to be expressly understood, however, that the drawings are for the purpose of illustration and description only, and are not intended as a definition of the limits of the invention.

In the drawings:

Figure 1 is a partial view of a flat lapping machine showing the lapping jigs in accordance with this invention in place on the machine;

Figure 2 is a cross-sectional view of a presently preferred embodiment of the invention in operating position upon a lapping wheel;

Figure 3 is a sectional view taken along line 3—3 of Fig. 2;

Figure 4 is a view in perspective of the holding piston disengaged from the guide cylinder;

Figure 5:
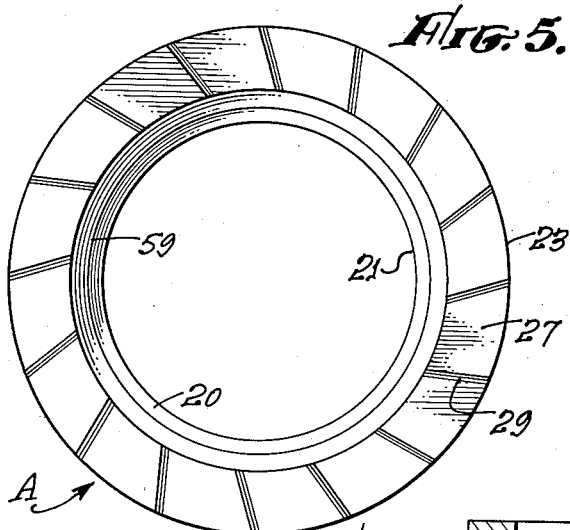
Figure 5 is a bottom plan view of the apparatus.

Referring now to the drawings, there is shown in Figure 1 a view in perspective of a flat wheel lapping machine of the type well known to the art and upon which the lapping jig of the present invention is particularly adapted to be used. The lapping machine includes a lapping wheel 10 which is extremely flat and stable and is slowly rotated. In the lapping machine shown, the lapping wheel is rotated in a horizontal plane and abrasive material in the form of soft abrasive garnet suspended in a suitable liquid is furnished to the surface of the lapping wheel from a reservoir 11 on the machine. The lapping wheel of the machine shown is stable in that its surface is kept flat by a continual self-lapping process. In this machine, conditioning rings 12 which are soft iron cylinders float upon the lapping surface 14 of the wheel 10. A plurality of idler rollers 13 are supported on extending arms 15 associated with each of the conditioning rings 12. These idler rollers coact with the conditioning rings in order to hold them in relation to each other and on the lapping wheel 14. These rings being of soft iron are worn away at a faster rate than the surface of the lapping wheel itself. However, their constant rotation upon the surface of the wheel while the wheel in turn rotates beneath them continues to lap the wheel and maintain it flat within one light fringe after the conditioning rings have been properly adjusted, all of which is well known to the prior art. In the embodiment shown in Figure 1, three conditioning rings and three lapping jigs in accordance with the present invention, are used upon the single lapping wheel.

Referring now to Figures 2, 3 and 4, a presently preferred embodiment of a lapping jig in accordance with the present invention is shown in detail. In Figures 1 and 2, the lapping jig is shown in its operating position within a conditioning ring 12 used in conjunction with the lapping machine. In general terms, the lapping jig of the present invention, comprises a guide cylinder A and a floating piston B. In this illustrative embodiment, both the guide cylinder A and the floating piston B are formed of stainless steel and the guide cylinder A is hardened by heat treatment for reason which will be discussed more fully hereinafter. The guide cylinder comprises a cylindrical body portion 20 which defines an interior wall 21 that is cylindrical and symmetrical with respect to the longitudinal axis of the cylinder. For purposes of clarity, in this embodiment the upper, or lapping surface 14 of the lapping wheel 10 is in the horizontal plane and the longitudinal axis of the lapping jig is in the vertical plane perpendicular to the abrasive surface. Thus, the interior cylindrical wall 21 of the cylinder 20 is perpendicular to the lapping surface 14 of the lapping wheel. At the lower end of the cylinder 20 there is formed an outwardly extending flange 23. The flange 23 is integral with the wall 20 of the cylinder and has an inside diameter substantially greater than the diameter of the interior wall 21 of the cylinder such that a clear opening is provided through the cylinder for movement of the piston B through the cylinder A as described hereinafter. The outside diameter of the flange 23 is sufficiently greater than the inside diameter thereof to furnish adequate support for the cylinder upon the lapping surface 14. It should also be noted that the outside diameter of the flange 23 as well as the corresponding outside diameter of the piston B are in part determined by the inside diameter of the conditioning ring 12. That is, the outside diameter of the flange 23 is approximately equal to but less than the inside diameter of the perpendicular wall 25 of the conditioning ring 12 in order that the lapping jig will be mateable with the conditioning ring used upon the lapping wheel. The lower, or bearing surface 27 of the flange 23 is machined or ground to a precision degree of flatness and is perpendicular to the longitudinal axis through the cylinder. Thus, when the guide cylinder A is positioned within the conditioning ring 12 and upon the abrasive surface 14 of the lapping wheel, the interior wall 21 of the cylinder is perpendicular to the lapping surface 14. The upper surface 28 of the flange 23 is also machined or ground with a high degree of precision of flatness and parallelism with the lower surface 27 of the flange and is thus also perpendicular to the longitudinal axis through the mounting cylinder. Since the surface 28 is a surface which receives no wear and cannot be easily damaged it acts as a secondary checking reference for the parallelism of the grooved surface 27 of the flange. Accordingly, so long as the lower surface 27 remains perpendicular to the longitudinal axis, the upper surface 28 of the flange is parallel to the lapping surface 14 of the lapping wheel 10. In order to retard the wear upon the lower surface 27 of the flange, the flange is hardened on at least the lower surface thereof. The inner surface 21 of the guide cylinder is also hardened, such that wear between the piston and cylinder occurs at the piston where refinishing can be more easily accomplished.

Referring now to Figures 2 and 5, a plurality of grooves 29 are provided from the outside diameter of the flange to the inside diameter thereof. These flange grooves 29 are preferably arranged circumferentially spaced about the surface of the flange 23 but are not radial with respect to the cylinder. The cross-sectional depth of the grooves is such that the abrasive fluid supplied to the lapping wheel can pass freely through the grooves beneath the flange to reach the work area which is in the interior, or within the inner diameter, of the flange 23.

An additional reference surface is provided at the upper surface of the guide cylinder A; that is, the upper surface 31 is also machined or ground to be flat to a high degree of precision and perpendicular to the longitudinal axis through the cylinder A. Thus, three parallel surfaces are provided on the guide cylinder which are perpendicular to the longitudinal axis through the cylinder. These being the lower surface 27 of the flange 23, the upper surface 28 thereof, and the upper surface 31 of the cylinder wall 20 of the guide cylinder A. A chamfer surface 32 is preferably provided at the upper end of the guide cylinder to connect at an angle the upper surface 31 and the interior wall 21 of the cylinder. The purpose of the chamfer is to allow easy insertion of the piston within the mounting cylinder and to allow fluid circulation as described hereinafter. A chamfer surface 43 is also provided at the bottom end of the mounting cylinder to provide ease of mating the parts.

Referring now particularly to Figures 2 and 4, the floating piston B upon which the bodies to be ground are mounted comprises a cylinder having a closed lower end and an outwardly extending flange at the upper end thereof. The cylindrical piston wall 40 is symmetrical about the longitudinal axis through the lapping jig which is vertical in this embodiment, and is mateable with the interior wall 21 of the mounting cylinder A. The vertical piston wall 40 has an outside diameter substantially equal to but less than the inside diameter of the cylinder wall 21 such that it is slidably mateable therewith. The mating fit between the inner wall 21 of the guide cylinder and the bearing wall 40 of the piston is very precise to assure perpendicularity. For example, in the presently preferred embodiment the diameter of the piston bearing wall 40 is of the order of 0.0002 inch less than the inside diameter of the guide cylinder wall 21. The closed lower end 41 of the piston is transverse to the piston wall 40 and has a lower or mounting surface 42 which is ground or machined to a high degree of precision and is perpendicular to the longitudinal axis through the piston and mounting cylinder. As was previously mentioned, a chamfer 43 is preferably provided around the periphery of the lower end 41 of the piston to allow easy insertion of the piston into the mounting cylinder. The outwardly extending flange 44 at the open upper end of the floating piston B has an outside diameter approximately equal to the outside diameter of the mounting cylinder wall 20. The lower surface 45 of the upper flange 44 is ground to a high degree of flatness and precision in the plane perpendicular to the longitudinal axis through the lapping jig such that it is also in the horizontal plane in this embodiment. The length of the floating piston between the lower, or mounting, surface 42 and the lower surface 45 of the outwardly extending flange 44 is dependent upon the length or height of the mounting cylinder A and is so determined that it is substantially equal to the height of the mounting cylinder from the lapping surface 14 of the lapping wheel to the upper surface 31 of the cylinder wall 20, such that the piston may be fully inserted into the mounting cylinder to allow the mounting surface 42 to contact the lapping surface if necessary. In order to assure flatness of the lower surface 45 of the outwardly extending flange 44 an undercut 46 is usually provided to prevent any slope at the adjacent corner where the vertical piston wall and horizontal surface 45 meet.

The degree of perpendicularity and flatness throughout the various surfaces and walls of the jig are accurately controlled to assure flatness and parallelism of the body being lapped. For example, the deviation from perpendicularity allowed in the present embodiment is of the order of 0.00001 inch while the accuracy of deviation from flatness is of the order of 0.000001 inch.

A plurality of longitudinally extending slots or grooves 46 are provided in the outer surface of the piston wall 40 to allow the flow of liquid between the piston wall and cylinder wall for purposes of cleaning abrasive solution away from the bearing surfaces and the face of the piston. Thus, liquid can flow from the upper surface 31 of the mounting cylinder to the lower end of the piston through the fluid grooves 46. As discussed hereinbefore the interior wall 21 of the mounting cylinder is preferably hardened to a degree greater than the outer wall of the piston in order that wear occurring between the two parts, will occur primarily on the outer face of the piston wall 40 since it is easier to replace worn metal on the outer surface of a cylinder than on the inner surface thereof.

A step 59 is preferably provided at the interior wall of the flange 23 to prevent the sweep of abrasive into the bearing area between the piston wall 40 and the guide cylinder wall 21. That is, by means of the step 59, abrasive which accumulates at the inner wall of the flange 23 is turned downward to the lapping surface rather than allowed to move upward into the area between the piston wall 40 and cylinder wall 21.

For ease of manufacture and use the cylinder bearing wall can be interrupted as a bearing surface, as, for example, by forming a circumferential groove 22. That is, the perpendicularity and mating fit between the piston and cylinder is maintained by utilizing bearing walls 21a and 21b of sufficient length near the upper and lower end of the cylinder.

In order to describe the method of utilizing the present invention, the precision lapping of three semiconductor silicon bodies will be used as illustrative. These bodies are such that they have previously been lapped to a high degree of flatness on one surface which becomes the upper or reference surface 51 of the body 50. The means for lapping one surface only are well known to the art and will not be described in detail. The lapping jig of the present invention is particularly useful in lapping the opposite surface 52 to a high degree of precision flatness while maintaining it parallel to the previously lapped surface 51 with accuracy measured in terms of light fringes. Thus, the crystal 50 is affixed to the flat transverse mounting surface 42 of the floating piston B. It may be affixed by suitable adhesives preferably by placing the lapped surface 51 in contact with the mounting surface 42 and bonding the wafer 50 by placing adhesive material 55 around the edges thereof in contact with the edge wall of the crystal and the surface 42. After the bodies have been mounted upon the piston B, the guide cylinder A is placed within the conditioning ring 12 and the piston B is inserted into the mounting cylinder A. In order to adjust the speed of lapping by means of the pressure between the bodies 50 and the lapping surface 14 weights 49 in various amounts are placed within the floating piston as shown in Figure 2. The lapping wheel is then rotated beneath the conditioning rings and the lapping jig to lap the surface 52 of the body 50. Since the lower surface 27 of the flange 23 is in the horizontal plane and since the piston is constrained to move only in the vertical direction with the mounting surface 42 also being horizontal, the lower surface 52 of the body 50 is lapped accurately parallel with the horizontal surface 42 and the upper surface 51 of the body 50. Since the upper surface 31 of the cylinder A is also parallel to the lower surface 27 thereof the maintenance of parallelism and precision of the jig can be readily checked by measuring, at a plurality of points around the periphery of the surface 31, the distance from the upper surface 31 to the lapping surface 14 to be sure that any wear occurring on the lower surface 27 of the flange is flat and transverse to the axis of the lapping jig. So long as measurements spaced around the periphery of the flange 23 from the surface 28 to the lapping surface 14 remain equal, it will be known that all wear occurring at the bottom surface is equal and that the flange is remaining horizontal, thus causing the mounting surface 42 to remain horizontal. Since the distance from the mounting surface 42 to the lower surface 45 of the flange 44 is known, the thickness to which the bodies are being lapped can be accurately measured by measuring the distance from the surface 45 to the lapping surface 14 periodically during the lapping operation.

During the lapping operation the lapping material suspended in a suitable vehicle flows onto the lapping wheel and through the fluid grooves in the conditioning rings and the fluid grooves 29 in the flange surface 27 to the lapping area under the bodies 50. After the bodies have been lapped to the desired thickness water or suitable fluid is introduced into the piston wall grooves 46 to wash abrasive solution away from the area near the lower bearing 21b and from the end of the piston. A secondary purpose is to lubricate the piston wall and mating cylinder wall to allow easy removal.

Figure 8:
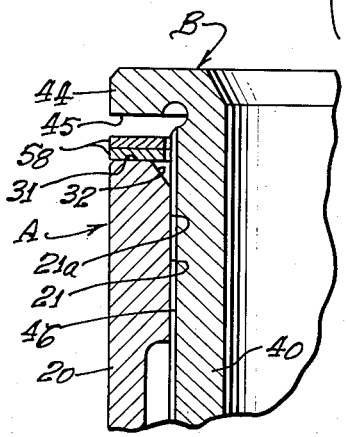
Figure 8 is a partial view in section showing the use of spacer rings to govern the extent of lapping.

In an alternative embodiment of the present invention, one or more spacer rings 58 are inserted between the upper surface 31 of the mounting cylinder and the lower surface 45 of the flange of the floating piston. These spacer or thickness rings 58 are accurately ground to have upper and lower surfaces which are parallel and horizontal such that when placed upon the cylinder wall 20 of the mounting piston they, in effect, limit the minimum height of the mounting cylinder to a predetermined degree. That is, the spacer rings have an inside diameter slightly larger than the inside diameter of the mounting cylinder and are of known height such that when placed upon the upper surface 31 of the mounting cylinder they prevent the downward movement of the piston beyond a predetermined limit. Thus, by positioning a thickness ring 58 as shown in Figure 8, the lapping operation can be carried out without interim measurements with the knowledge that the bodies being lapped cannot be lapped beyond a predetermined thickness. Thus, if it is wished to lap the bodies to an accurate thickness of 15 mils, for example, the spacer or thickness ring 58 will be positioned upon the mounting cylinder as shown and will be of sufficient thickness to prevent the mounting surface 42 from moving closer than 15 mils to the lapping surface 14. That is, the height of the spacer ring is determined to give an approximation of the desired thickness which approximation is always slightly greater than the desired finished dimension. The exact allowance depends on both abrasive size and material. For example, the ring 58 is determined such that the bottom surface 45 of the flange 44 rests upon the ring 58 when the bodies 50 have been lapped to 15.1 mils and no further lapping can occur. The remaining 0.1 mil is then lapped by removing the ring 58 and lapping lightly while alternately accurately measuring the body thickness. The inside diameter of the spacer ring 58 is preferably substantially greater than the outside diameter of the piston bearing wall 40. This is advantageous not only for ease of assembly, but also to determine more quickly and accurately when the flange 44 has come to rest upon the spacer ring. That is, so long as the flange 44 is not in bearing contact with the spacer ring the ring can be moved radially. However, when such contact exists the spacer ring will no longer move freely. The use of spacer rings permits flexibility of use of the lapping jig. The rings can be used in combinations of varying thicknesses as a guide to the thickness to which the body has been lapped, and in addition, the use of spacer rings permits the use of the jig for a long period of time. Thus, even though considerable wear has occurred at the surface 27 of the flange 23 during extended use of the jig, such wear can be compensated by use of spacer rings.

The use of a hollow piston permits variable loading on the body being lapped to allow control of the lapping rate and abrasion damage.

Figure 6:
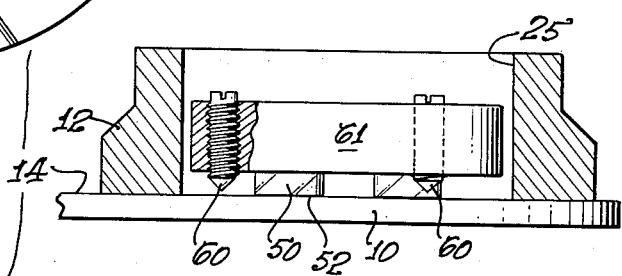
Figure 6 is a partially sectional view of a lapping jig known to the prior art.
Figure 7:
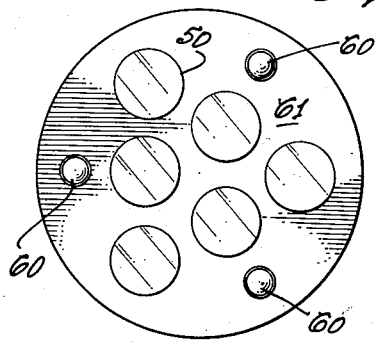
Figure 7 is a bottom view of the prior art lapping jig of Figure 6.

In Figures 6 and 7, there is shown a common method of the prior art utilized in an attempt to obtain flat parallel lapping. In the apparatus as shown in Figures 6 and 7 it was attempted to provide parallelism by adjusting three diamond pointed screws 60 to the plane at which the lower faces 52 of the bodies 50 were parallel to the upper faces. The mounting block 61 through which the screws extend is loosely floating within the conditioning ring 12. The expense and difficulties inherent in such apparatus will be appreciated in view of the foregoing description of operation of the present invention. The present invention accordingly provides an improved lapping jig for holding and positioning a body to be lapped upon a rotating lapping wheel whereby accurately controlled flat parallel faces are obtained on the body. By means of the present invention a body of predetermined thickness having opposed flat parallel faces can be accurately obtained with a minimum of operator control or setting of the lapping wheel or lapping jig.

What is claimed is:

1. A lapping jig for lapping a body to obtain a flat surface parallel to a flat reference surface of said body, said lapping jig adapted to be utilized in combination with a flat rotary lapping wheel having a lapping surface relatively oriented in the horizontal plane comprising: a vertically oriented guide cylinder, said cylinder defining an opening therethrough having vertically extending bearing walls symmetrical with respect to the vertical axis of said jig, a support flange affixed at the lower end of said cylinder, said support flange having a lower surface adapted to be positioned in contact with said lapping surface, said support surface being transverse to the vertical axis of said jig; a holding piston, said piston having an exterior surface symmetrical and parallel with respect to said vertical axis, said piston exterior surface being mateable with and longitudinally movable within said opening, said piston having a flat lower mounting surface transverse to said vertical axis, a flange affixed at the upper end of said piston, said flange having a lower horizontal surface mateable with the upper surface of said guide cylinder, the vertical distance from the lower mounting surface to the lower surface of said piston flange being approximately equal to the height of said guide cylinder, whereby bodies affixed to said lower mounting surface are lapped in the horizontal plane when said jig is positioned upon said lapping wheel and the piston is engaged in the guide cylinder.

2. A lapping jig for lapping a body to obtain a flat surface parallel to a flat reference surface of said body, said lapping jig adapted to be utilized in combination with a flat rotary lapping wheel having a lapping surface relatively oriented in the horizontal plane comprising: a vertically oriented guide cylinder, said cylinder defining an opening therethrough having vertically extending bearing walls symmetrical with respect to the vertical axis of said jig, a support flange affixed at the lower end of said cylinder, said support flange having a lower surface adapted to be positioned in contact with said lapping surface, said support surface being transverse to the vertical axis of said jig; a holding piston, said piston having an exterior surface symmetrical and parallel with respect to said vertical axis, said piston exterior surface being mateable with and longitudinally movable within said opening, said piston having a flat lower mounting surface transverse to said vertical axis, a flange affixed at the upper end of said piston, said flange having a lower horizontal surface mateable with the upper surface of said guide cylinder, the vertical distance from the lower mounting surface to the lower surface of said piston flange being approximately equal to the height of said guide cylinder and a spacer member positioned between the upper surface of said cylinder and the lower surface of said piston flange to limit the extent of downward movement of said piston into said cylinder, whereby bodies affixed to said lower mounting surface are lapped in the horizontal plane when said jig is positioned upon said lapping wheel and the piston is engaged in the guide cylinder.

3. A lapping jig for lapping a body to obtain a flat surface parallel to a flat reference surface of said body, said lapping jig adapted to be utilized in combination with a flat rotary lapping wheel having a lapping surface relatively oriented in the horizontal plane comprising: a vertically oriented guide cylinder, said cylinder defining an opening therethrough having vertically extending bearing walls symmetrical with respect to the vertical axis of said jig, a support flange affixed at the lower end of said cylinder, said support flange having a lower surface adapted to be positioned in contact with said lapping surface, said support surface being transverse to the vertical axis of said jig; a holding piston, said piston having an exterior surface symmetrical and parallel with respect to said vertical axis, said piston exterior surface being mateable with and longitudinally movable within said opening, said piston having a flat lower mounting surface transverse to said vertical axis, a flange affixed at the upper end of said piston, said flange having a lower horizontal surface mateable with the upper surface of said guide cylinder, the vertical distance from the lower mounting surface to the lower surface of said piston flange being approximately equal to the height of said guide cylinder, and a spacer member positioned between the upper surface of said cylinder and the lower surface of said piston flange to limit the extent of downward movement of said piston into said cylinder, said spacer member being a ring having an inside diameter greater than the outside diameter of said piston, said spacer member having upper and lower surface which are flat and transverse to said vertical axis of said jig, whereby bodies affixed to said lower mounting surface are lapped in the horizontal plane when said jig is positioned upon said lapping wheel and the piston is engaged in the guide cylinder.

4. A lapping jig for lapping a body to obtain a flat surface parallel to a flat reference surface of said body, said lapping jig adapted to be utilized in combination with a flat rotary lapping wheel having a lapping surface relatively oriented in the horizontal plane comprising: a vertically oriented guide cylinder, said cylinder defining an opening therethrough having vertically extending bearing walls symmetrical with respect to the vertical axis of said jig, a support flange affixed at the lower end of said cylinder, said support flange having a lower surface adapted to be positioned in contact with said lapping surface, said support surface being transverse to the vertical axis of said jig; a holding piston, said piston having an exterior surface symmetrical and parallel with respect to said vertical axis, said piston exterior surface being mateable with and longitudinally movable within said opening, said piston having a flat lower mounting surface transverse to said vertical axis, a flange affixed at the upper end of said piston, said flange having a lower horizontal surface mateable with the upper surface of said guide cylinder, the vertical distance from the lower mounting surface to the lower surface of said piston flange being approximately equal to the height of said guide cylinder, and a plurality of spacer rings positioned between the upper surface of said cylinder and the lower surface of said piston flange, each of said rings having an inside diameter greater than the outside diameter of said piston, each of said rings being of predetermined thickness with upper and lower surfaces which are flat and transverse to said vertical axis of said jig to limit the extent of downward movement of said piston into said cylinder to a predetermined extent, whereby bodies affixed to said lower mounting surface are lapped in the horizontal plane when said jig is positioned upon said lapping wheel and the piston is engaged in the guide cylinder.

5. A lapping jig for lapping a body to obtain a flat surface parallel to a flat reference surface of said body, said lapping jig adapted to be utilized in combination with a flat rotary lapping wheel having a lapping surface relatively oriented in the horizontal plane comprising: a vertically oriented guide cylinder, said cylinder defining an opening therethrough having vertically extending bearing walls symmetrical with respect to the vertical axis of said jig, a support flange affixed at the lower end of said cylinder, said support flange having a lower surface adapted to be positioned in contact with said lapping surface, said support surface being transverse to the vertical axis of said jig; a holding piston, said piston having an exterior surface symmetrical and parallel with respect to said vertical axis, said piston exterior surface being mateable with and longitudinally movable within said opening, said piston having a flat lower mounting surface transverse to said vertical axis, said piston defining an interior chamber having an open upper end, weight means within said chamber to exert a predetermined downward force on said piston, whereby bodies affixed to said lower mounting surface are lapped in the horizontal plane when said jig is positioned upon said lapping wheel and the piston is engaged in the guide cylinder.

6. A lapping jig for lapping a body to obtain a flat surface parallel to a flat reference surface of said body, said lapping jig adapted to be utilized in combination with a flat rotary lapping wheel having a lapping surface relatively oriented in the horizontal plane comprising: a vertically oriented guide cylinder, said cylinder defining an opening therethrough having vertically extending bearing walls symmetrical with respect to the vertical axis of said jig, a support flange affixed at the lower end of said cylinder, said support flange having a lower surface adapted to be positioned in contact with said lapping surface, said support surface being transverse to the vertical axis of said jig; a holding piston, said piston having an exterior surface symmetrical and parallel with respect to said vertical axis, said piston exterior surface being mateable with and longitudinally movable within said opening, said piston having a flat lower mounting surface transverse to said vertical axis, a flange affixed at the upper end of said piston, said flange having a lower horizontal surface mateable with the upper surface of said guide cylinder, the vertical distance from the lower mounting surface to the lower surface of said piston flange being approximately equal to the height of said guide cylinder, said piston defining an interior chamber having an open upper end, weight means within said chamber to exert a predetermined downward force on said piston, whereby bodies affixed to said lower mounting surface are lapped in the horizontal plane when said jig is positioned upon said lapping wheel and the piston is engaged in the guide cylinder.

References Cited in the file of this patent

UNITED STATES PATENTS

| | | |
|---|---|---|
| 2,634,558 | Wolfskill | Apr. 14, 1953 |
| 2,842,906 | Carter et al. | July 15, 1958 |